Nov. 20, 1962 D. BOSWELL ETAL 3,065,390

ELECTRICAL DEVICES HAVING HERMETICALLY SEALED ENVELOPES

Filed July 6, 1959

INVENTORS
DAVID BOSWELL
JAMES SAMUEL MILLER
BY Kirschstein, Kirschstein & Ottinger
ATTORNEYS

United States Patent Office 3,065,390

Patented Nov. 20, 1962

3,065,390

ELECTRICAL DEVICES HAVING HERMETICALLY SEALED ENVELOPES

David Boswell, London, and James Samuel Miller, Bramhall, England, assignors to The General Electric Company Limited, London, England Filed July 6, 1959, Ser. No. 825,184

Claims priority, application Great Britain Aug. 13, 1958

6 Claims. (Cl. 317—234)

Figures 1, 2:
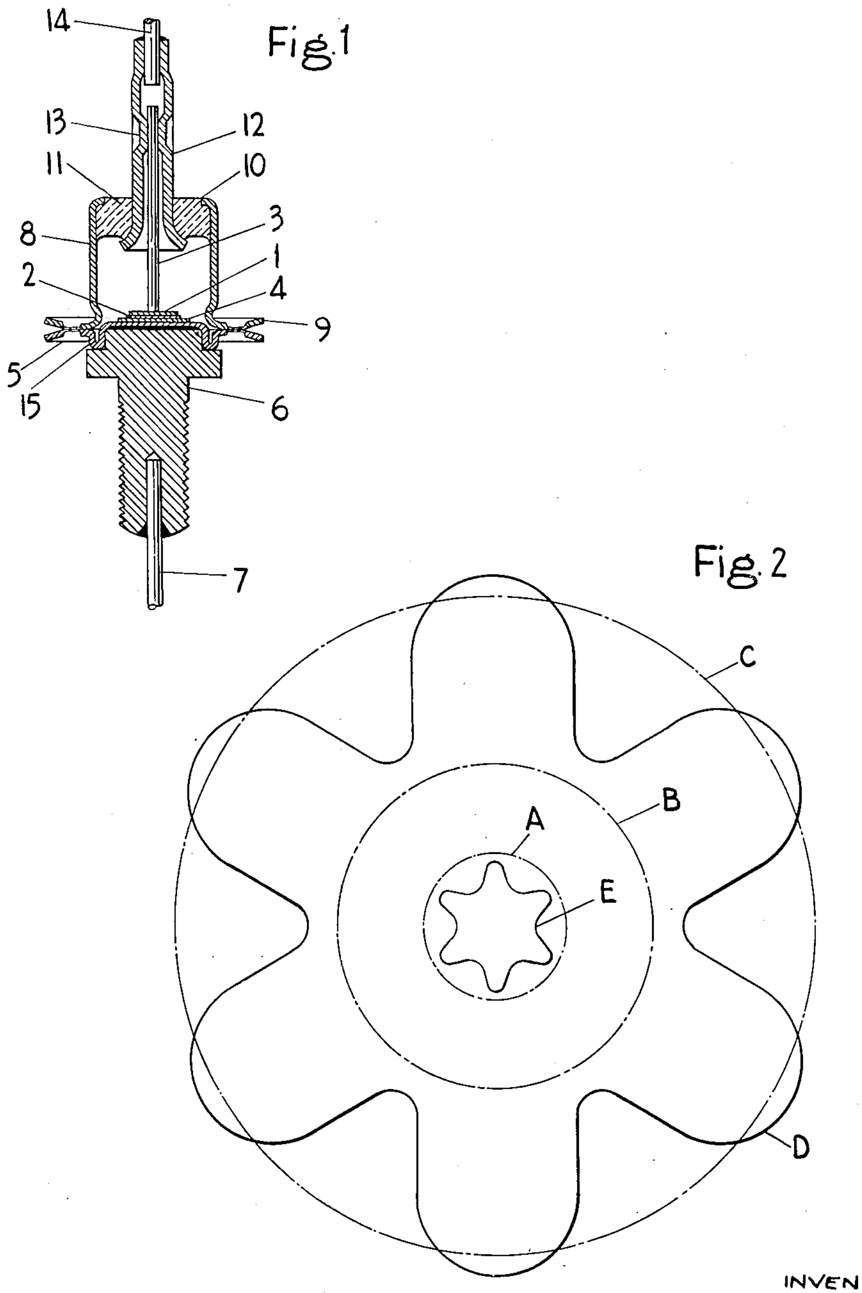

This invention relates to electrical devices having hermetically sealed envelopes.

The invention provides in such a device a lead-in arrangement consisting of a metal tube sealed through an electrically insulating member forming part of the envelope, an external lead wire extending into the tube from the outer end of the tube, and an internal lead wire extending into the tube from the inner end of the tube, the external lead wire being hermetically sealed in the tube in good electrical contact with the tube and the tube being squeezed on to the internal lead wire so as to provide a good electrical connection between them.

One embodiment of the invention will now be described by way of example with reference to the accompanying drawings, in which FIGURE 1 is a sectional view of a silicon P-N junction rectifier; and FIGURE 2 is an explanatory diagram.

Referring to FIGURE 1 of the drawings, the rectifier includes a wafer 1 of N-type silicon, one main face of which is alloyed to one main face of a disc of foil 2 of a gold-antimony alloy, which provides an ohmic contact to the wafer 1. To the centre of the other main face of the wafer 1 is alloyed one end of an aluminium wire 3, the P-N junction of the rectifier being situated between a region of P-type silicon formed by the alloying and the basic material of the wafer 1; the wire 3, which has a diameter of 0.38 millimetre and extends perpendicularly to the main faces of the wafer 1, constitutes a lead for the P-type region.

The main face of the foil 2 remote from the wafer 1 is soldered by means of a disc of tin 4 to the central region of one main face of a copper disc 5 which forms part of the envelope of the rectifier. The other main face of the disc 5 is brazed to a threaded phosphor bronze mounting stud 6, the end of which remote from the disc 5 has brazed to it a copper lead wire 7.

The envelope of the rectifier also includes a copper tube 8 which is provided at one end with an externally projecting peripheral flange 9 and at the other end with an internally projecting peripheral flange 10. The flange 9 has an outer diameter equal to the diameter of the disc 5 and is sealed, in a manner described below, to the outer part of the disc 5, with the tube 8 surrounding and disposed coaxially with the wire 3. Inside the end of the tube 8 provided with the internal flange 10 is sealed a bead of glass 11, through the centre of which is sealed a second copper tube 12 which extends coaxially with the wire 3. The glass of the bead 11 preferably has a composition in accordance with United States patent application No. 658,531 and may, for example, have a composition (by weight) substantially of 42% silica, 20% titanium dioxide, 17% sodium oxide, 14% potassium oxide, 4% strontium oxide and 3% barium oxide.

Over most of its length, the tube 12 has a circular cross-section with external and internal diameters of 1.75 millimetres and 0.85 millimetre respectively; the tube 12 has a length of 8.75 millimetres, approximately three-quarters of this length being disposed on the side of the bead 11 corresponding to the outside of the envelope. The wire 3 extends into the tube 12 from the inner end of the tube

12 for a distance of about six millimetres and a portion 13 of the tube 12, about 1.3 millimetres long and disposed slightly nearer to the outer end of the tube 12 than to its inner end, is squeezed onto the wire 3 so as to provide a good electrical connection between the wire 3 and the tube 12. A second copper lead wire 14, having a diameter of 0.8 millimetre, extends into the tube 12 from the outer end of the tube 12 for a distance of 1.6 millimetres and is hermetically sealed in this end of the tube 12 in a manner which will be described below.

In the manufacture of the rectifier two assemblies are formed, one assembly including the wire 7, the stud 6, the disc 5, the foil 2, the wafer 1 and the wire 3, and the other assembly consisting of the tube 8, the bead 11, the tube 12 and the wire 14. In the production of the second assembly, the tubes 8 and 12 and the bead 11 are first sealed together and are then thoroughly cleaned chemically so as to remove any oxide which may have formed on the surface of the copper, particularly inside the tube 12. The wire 14 is then inserted in the outer end of the tube 12, and this end of the tube 12 is then squeezed over a length of 1.5 millimetres so as to form a mechanical joint between it and the wire 14; the squeezing is such that the external periphery of the cross-section of the tube 12 is reduced to a regular hexagon having sides of length 0.67 millimetre. The wire 14 and the tube 12 are then hermetically sealed together by soldering.

To complete the manufacture of the rectifier, the two assemblies referred to above are brought together with the wire 3 projecting into the tube 12 from its inner end and with the flange 9 in contact with the outer part of the disc 5. An annular seal is made between the flange 9 and the disc 5 by cold pressure welding, the parts of the rectifier being disposed in an enclosure filled with dry gas during the welding operation so as to provide a suitable permanent gas filling for the envelope. As is usual in cold pressure welding, the surfaces to be joined are thoroughly cleaned, for example by scratch brushing, immediately before the welding operation, and in order to accommodate radially inward flow of the metal during the welding operation a corrugation 15 is formed in the disc 5 between the position of the weld and the central region to which the wafer 1 is secured.

Finally, the tube 12 is squeezed on to the wire 3 as described above; the squeezing may be carried out in various ways, one suitable arrangement being illustrated in FIGURE 2 of the drawings, in which the chain lines A, B and C respectively represent the surface of the wire 3 and the internal and external surfaces of the tube 12 before the squeezing, while the solid lines D and E respectively represent the external surface of the tube 12 and the interface between the wire 3 and the tube 12 after the squeezing.

The lead-in arrangement described above enables a satisfactory electrical connection to be made between the wires 3 and 14 in a relatively inexpensive manner which permits satisfactory sealing of the envelope.

We claim:

1. A semiconductor device including a hermetically sealed envelope partly formed by an electrically insulating member through which a metal tube is sealed, a semiconductor body disposed within the envelope and secured to a metallic member forming part of the envelope so that a first region of the body is in good electrical and thermal contact therewith, an internal lead wire constituting a lead for a second region of the body which is separated from the first region by a P-N junction, the internal lead wire extending into the tube from the inner end of the tube, and an external lead wire extending into the tube from the outer end of the tube, the external lead wire being hermetically sealed in the tube in good electrical contact with the tube and the tube being squeezed on to the internal lead wire so as to provide a good electrical connection between them.

2. A semiconductor device according to claim 1, in which the tube is of copper.

3. A semiconductor device according to claim 2, in which the internal lead wire is of aluminium.

4. A semiconductor device according to claim 2, in which the electrically insulating member is of glass having a composition (by weight) substantially of 42% silica, 20% titanium dioxide, 17% sodium oxide, 14% potassium oxide, 4% strontium oxide and 3% barium oxide.

5. A semiconductor device according to claim 1, in which the electrically insulating member is sealed in an aperture in a second metallic member forming part of the envelope, the two metallic members being sealed together by cold pressure welding.

6. An electrical device according to claim 5, in which the two metallic members are of copper.

References Cited in the file of this patent

UNITED STATES PATENTS

| | | |
|---|---|---|
| 557,037 | Toquet | Mar. 24, 1896 |
| 2,682,022 | Doran | June 22, 1954 |
| 2,704,818 | North | Mar. 22, 1955 |
| 2,813,326 | Liebowitz | Nov. 19, 1957 |
| 2,836,878 | Shepard | June 3, 1958 |
| 2,862,160 | Ross | Nov. 25, 1958 |
| 2,866,140 | Jones et al. | Dec. 23, 1958 |
| 2,921,244 | Emeis | Jan. 12, 1960 |
| 2,988,676 | North | June 13, 1961 |